United States Patent [19]

Sato et al.

[11] Patent Number: 5,059,860
[45] Date of Patent: Oct. 22, 1991

[54] ILLUMINATING LIGHT SOURCE FOR COLOR IMAGE RECORDING DEVICE

[75] Inventors: Masaaki Sato; Izumi Takashima, both of Kanagawa, Japan

[73] Assignee: Fuji Xerox Co., Ltd., Tokyo, Japan

[21] Appl. No.: 530,311

[22] Filed: May 30, 1990

[30] Foreign Application Priority Data

Jun. 2, 1989 [JP] Japan .................................. 1-140660

[51] Int. Cl.$^5$ ................................................ H01J 1/62
[52] U.S. Cl. ..................................... 313/488; 313/493; 315/116
[58] Field of Search .......................... 313/44, 488, 493; 315/116, 117

[56] References Cited

U.S. PATENT DOCUMENTS

| | | | |
|---|---|---|---|
| 3,141,990 | 7/1964 | Ray | 313/488 |
| 3,336,502 | 8/1967 | Gilliatt | 315/116 |
| 4,255,687 | 3/1981 | van Engeleen et al. | 313/488 |
| 4,774,550 | 9/1988 | Igarashi | 313/493 |

Primary Examiner—Donald J. Yusko
Assistant Examiner—Diab Hamadi
Attorney, Agent, or Firm—Finnegan, Henderson, Farabow, Garrett, and Dunner

[57] ABSTRACT

An illuminating light source for a color image recording device comprises a glass tube having a predetermined diameter, a reflecting film coated on an inner wall of the glass tube excepting a part thereof by coating, a fluorescent film formed on the reflecting film coated on the glass tube, wherein at least one of a ultraviolet ray absorbing film and the fluorescent film is formed on the part on which the reflecting film is not formed thereby to maintain a ratio of a bright line to a fluorescence being not more than 1.3 when a fluorescent lamp current is applied.

10 Claims, 10 Drawing Sheets

ILLUMINATING LIGHT SOURCE FOR COLOR IMAGE RECORDING DEVICE

BACKGROUND OF THE INVENTION

This invention relates to an illuminating light source for a color image recording device.

Recently, a device has been proposed in the art which reads a color original photo-electrically, and prints out a color image through various color image processing operations.

In a color image reading device of this type, a daylight light source such as a fluorescent lamp or halogen lamp which outputs a large quantity of light on low electric power is used to irradiate the surface of an original, and light reflected therefrom is detected with a contact type CCD (charge-coupled device) line sensor for instance.

Figure 13:
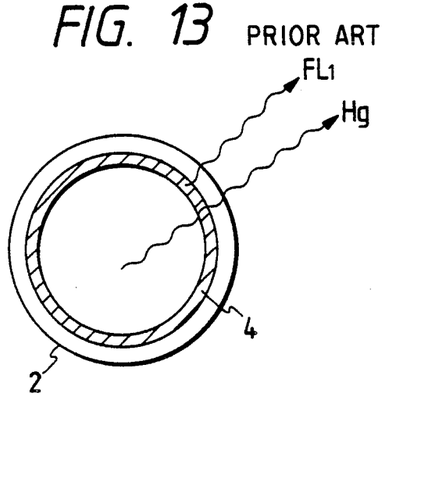
FIGS. 13 and 14 are sectional views of examples of a conventional fluorescent lamp used to read originals.

FIG. 13 is a sectional view of an ordinary fluorescent light used for reading an original. In the fluorescent lamp, a fluorescent film is formed on the inner wall of a glass tube 2, which is filled with mercury vapor. When, under the condition that the mercury vapor pressure in the glass tube is increased with the mercury vapor heated by a heater (not shown), electric discharges are induced therein, ultraviolet rays high in intensity (257 nm) are emitted from the mercury vapor in the glass tube, thus exciting the fluorescent substance of the fluorescent film 4 to emit fluorescence. In addition, the mercury vapor produces a bright line spectrum in a visible range. In this case, the bright line from the mercury vapor in an ultraviolet range is scarcely emitted outside, being absorbed by the glass tube 2. However, in the fluorescent lamp shown in FIG. 13, the fluorescence is radiated in all directions, and therefore the quantity of light applied to the surface of the original is not so large.

Figure 14:
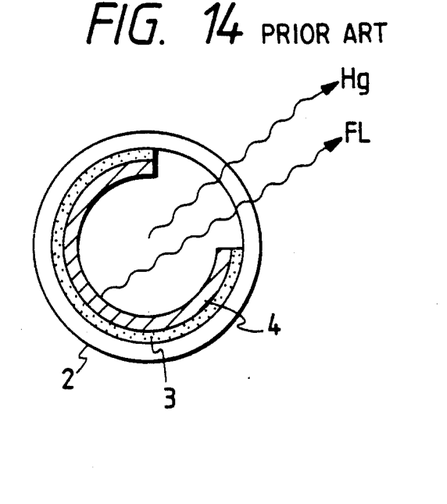

In order to overcome this difficulty, a fluorescent lamp as shown in FIG. 14 has been proposed in the art. That is, as shown in FIG. 14, in order to increase the quantity of light applied to the surface of an original, a reflecting film 3 is formed on the inner wall of a glass tube except its part (aperture), and a fluorescent film 4 is formed on the reflecting film 3. In the fluorescent lamp thus constructed, the reflecting film is located behind the fluorescent film. Hence, the fluorescence reflected is allowed to go towards the original through the aperture which is not covered by the reflecting film 3. Thus, the fluorescent lamp is high in light emitting efficiency, providing a large quantity of light.

Figure 15:
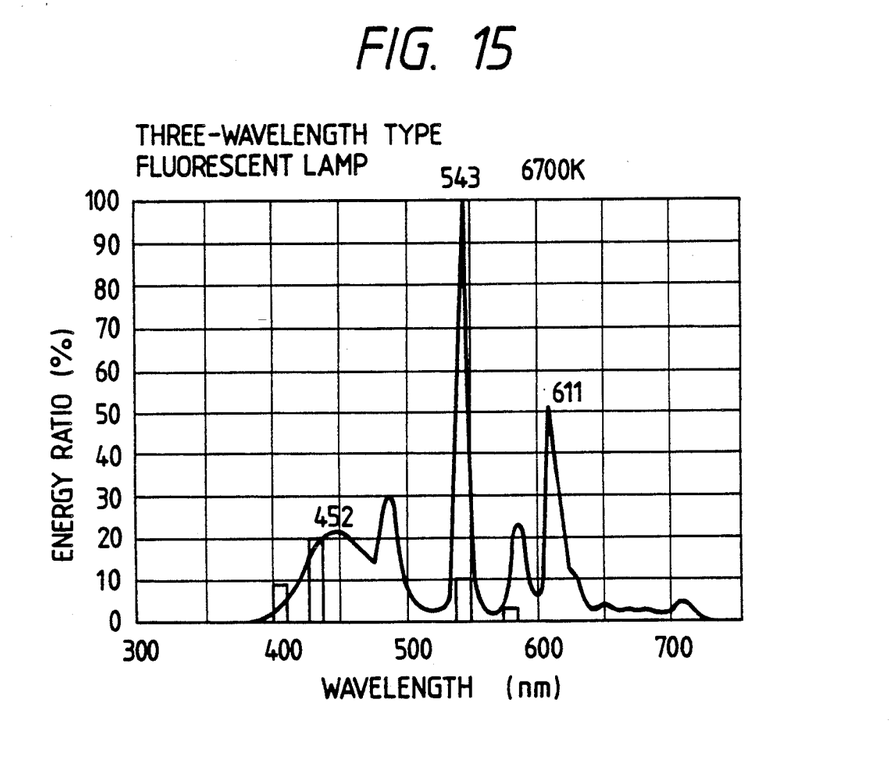
FIG. 15 is a graphical representation indicating a light quantity spectral characteristic of a daylight fluorescent lamp of three-wavelength type.

FIG. 15 is a diagram showing a spectral characteristic of a so-called "three-wavelength type fluorescent lamp". The specific feature of the fluorescent lamp resides in that the quantity of light is large. However, since the bright line is great, a so-called "metamerism phenomenon" takes place in which the color read is different from that which is observed with the human eye.

Figure 16:
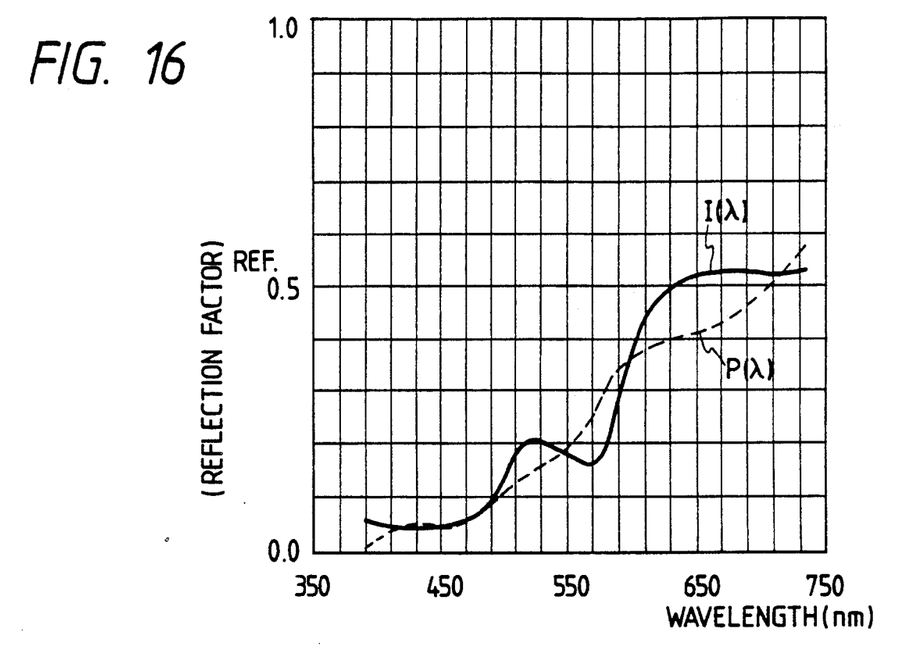
FIGS. 16 and 17 are graphical representations indicating spectral characteristics of pictures and prints.
Figure 17:
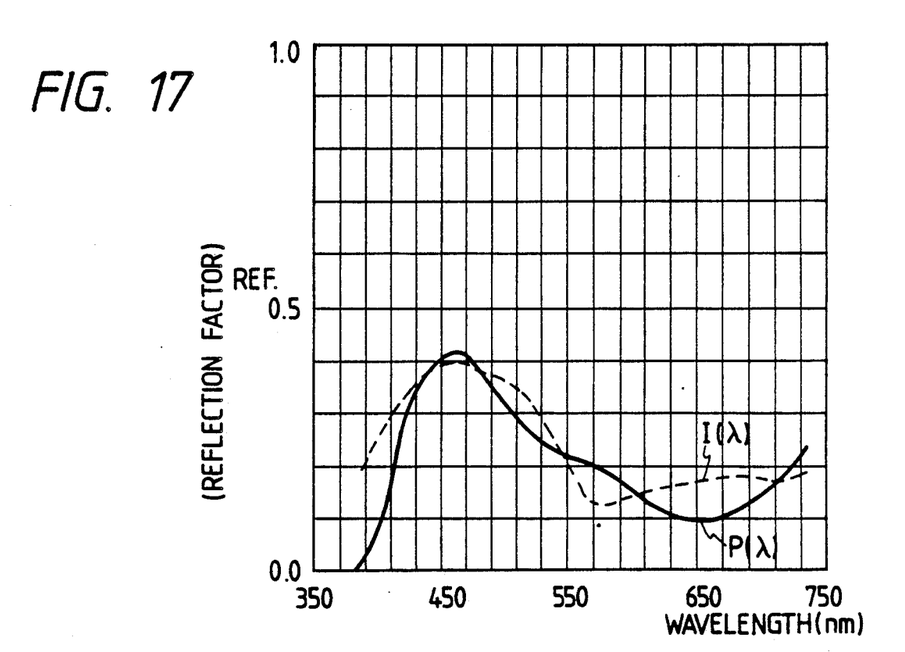

Color originals to be read are prints, pictures, etc. FIG. 16 is a diagram showing spectral characteristics of a print and a picture in the case of skin color, and FIG. 17 is a diagram showing spectral characteristics of a print and a picture in the case of sky-blue color. In these figures, reference character I (λ) designates the spectral characteristics of the prints, and P (λ) the spectral characteristics of the pictures.

When such originals are observed with the human eye under a standard light source which is of the order of 6700K in color temperature and flat in spectral characteristic, they are seen as if they were the same in color even if they are different in spectral characteristic, because the human eye perceives colors with so-called "three stimulus values (three original stimuli required for color matching with the color stimulus of a specimen). Hence, when, in a color image recording device, the prints and the pictures shown in FIGS. 16 and 17 are read with a CCD line sensor, the same R, G and B values must be outputted.

In the case where the aperture type fluorescent lamp as shown in FIG. 14 is used, the bright lines in the visible range are emitted out of the tube directly, being not absorbed. Therefore, in the case where the bright lines are of long wavelengths as in the case of prints or pictures which are large in spectral characteristic difference, then the difference is read with emphasis, as a result of which the same R, G and B values cannot be outputted; that is, a different color image is reproduced. This is more serious with the three-wavelength type fluorescent lamp as shown in FIG. 15 because the bright line is great.

Figure 3:
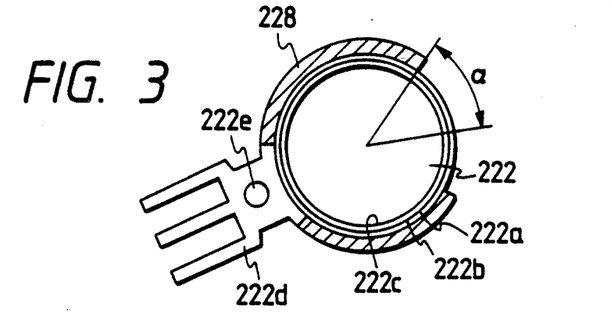
FIG. 3 is a diagram showing the structure of a fluorescent lamp in FIG. 2.

In order to eliminate this difficulty, it is necessary to reduce a ratio of bright line to fluorescence, which is a ratio of the output power of the bright line spectrum produced by the mercury vapor to that of the fluorescence emitted by the fluorescent material. As shown in FIG. 3, a fluorescent lamp generally has a heat sink 222d at the middle of its tube because of the following reason: A light emitting efficiency is a function of mercury vapor pressure.

Not only when the mercury vapor pressure in the tube is excessively high but also when it is excessively low, the light emitting efficiency is decreased, and an aimed quantity of light cannot be obtained. Therefore, a heat sink is provided in the tube at the middle to radiate heat thereby to decrease the saturated vapor pressure. As a result, the unwanted vapor at both ends of the tube is moved towards the center, whereby the vapor pressure in the tube is made suitable.

Figure 18:
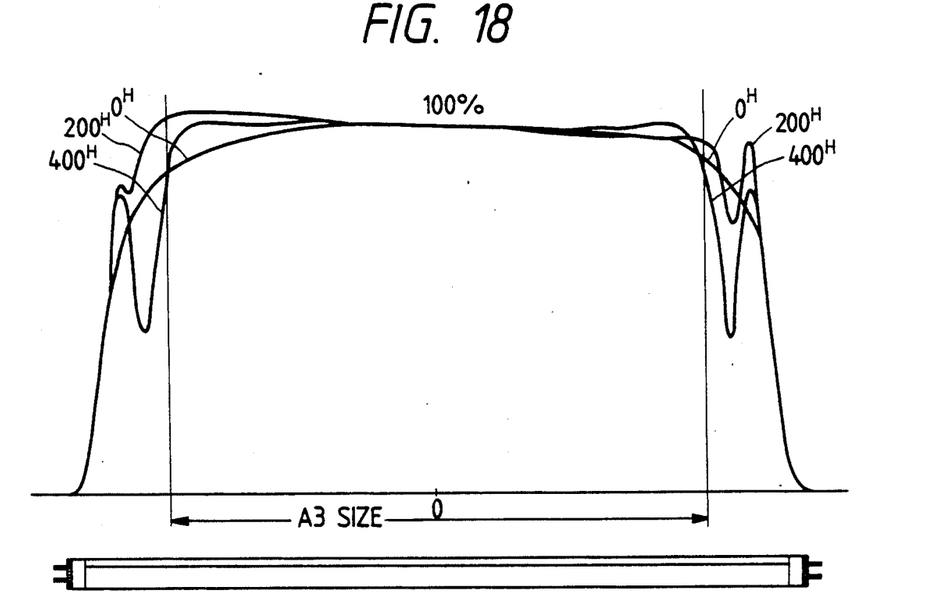
FIG. 18 is an explanatory diagram indicating variations in temperature with cumulative lighting time.

When an aperture type fluorescent lamp (15.5 mm in tube diameter) as shown in FIG. 14 is turned on and off at a cycle of 10 seconds on and 10 seconds off with a lamp current 400 mA, the distribution of luminescence in the longitudinal direction of the tube is as shown in FIG. 18.

Figure 19A:
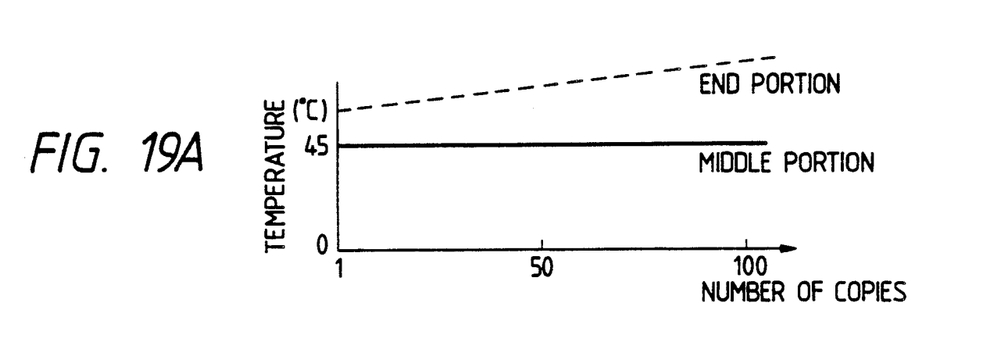
FIG. 19A is a graphical representation indicating temperatures with numbers of copies printed.
Figure 19B:
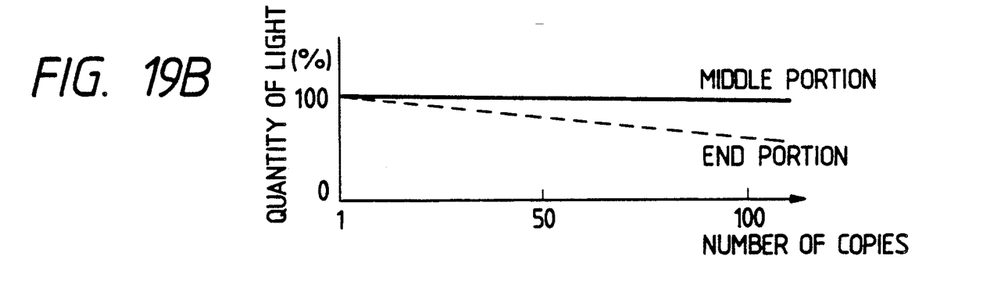
FIG. 19B is also a graphical representation indicating light quantities with numbers of copies printed.

When, as shown in FIG. 19A, the number of copies is increased with the middle portion of the tube held at a temperature of 45° C. by the heat sink, then the end portions of the tube are increased in temperature by discharge heating, and the mercury vapor pressure is increased. As a result, at each of the end portions the quantity of light is decreased as shown in FIG. 19B.

Figure 20:
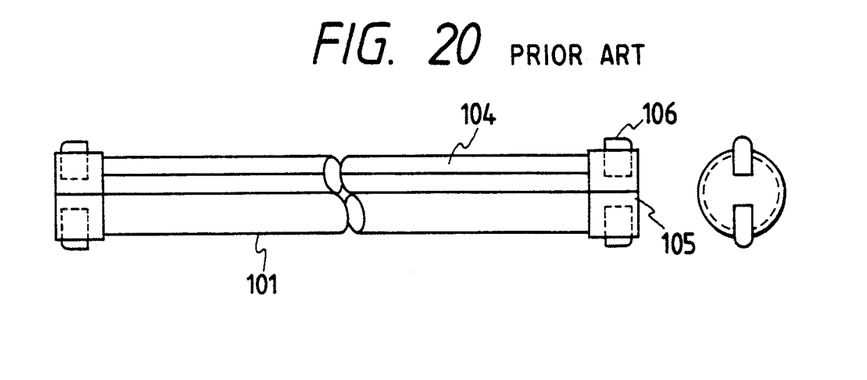
FIGS. 20 and 21 are diagrams showing a conventional fluorescent lamp.
Figure 21:
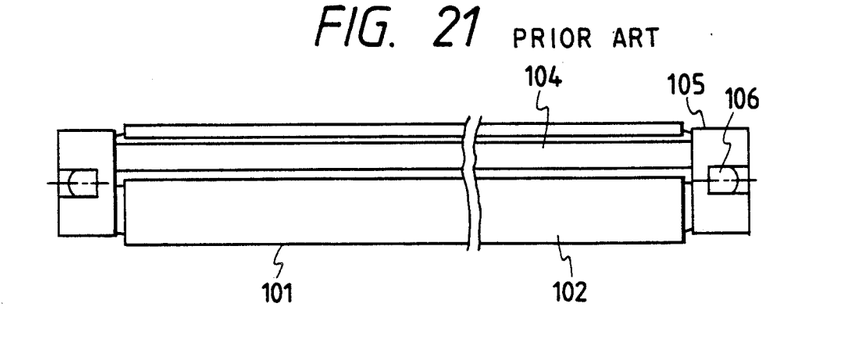
Figure 22A:
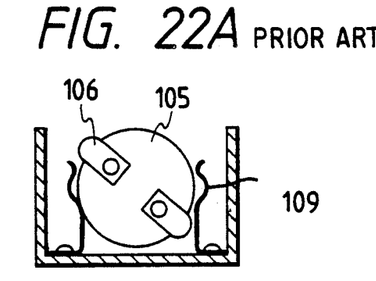
FIGS. 22A and 22B are diagrams for a description of the connection of the conventional fluorescent lamp to the sockets.
Figure 22B:
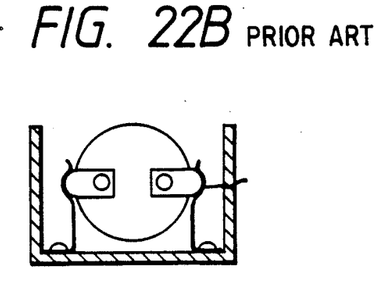

A lamp as shown in FIGS. 20 and 21 is known in the art which are a top view and a side view thereof. The lamp is formed as follows: Bases 105 are connected to both ends of a fluorescent lamp 101 which comprises a glass tube embraced by a lamp heater 102 and an aperture 104 for radiation of light. The bases 105 have cuts, in which conductors 106 are provided. In connecting the lamp to its sockets 109, as shown in FIG. 22A the two ends of the lamp are inserted into the sockets 109 from above with the conductors 106 of the bases 105 held oblique, and then the lamp is turned 45° about its axis so that it is fixedly connected to the sockets 109 as shown in FIG. 22B.

Figure 23:
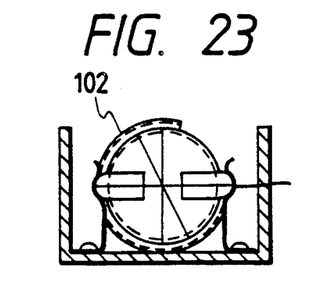
FIG. 23 is a diagram for a description of a method of coupling a heater to the conventional fluorescent lamp.

Furthermore, a lamp heater 102 is combined with the lamp to stabilize the quantity of light of the latter as shown in FIG. 23. Under this condition, the bases of the lamp are connected to the sockets by turning it. In this operation, the heater may be displaced to cover the aperture 104. This difficulty occurs with high probability. And it is rather difficult to handle the lamp so that the latter is correctly connected to the sockets. Furthermore, a skilled person must carry out the operation of coupling the heater to the lamp while confirming the position of the aperture. Therefore, an unskilled person may install the lamp incorrectly to start the image recording device, thus causing a printing error.

SUMMARY OF THE INVENTION

An object of this invention is to eliminate the above-described difficulties.

More specifically, a first object of the invention is to reduce the ratio of bright line to fluorescence to 1.3 or less thereby to improve the image reproducibility.

A second object of the invention is to set the lamp tube current and tube wall temperature in most suitable ranges thereby to set the bright line to fluorescence ratio to 1.3 or less, and to use the fluorescent lamp with parameters which scarcely affect the light emitting efficiency.

A third object of the invention is to improve the heat radiation characteristic of the end portions of the fluorescent lamp, thereby to improve the light distribution characteristic.

A fourth object of the invention is to detect the tube wall temperature during the standby period, thereby to control the temperature of the fluorescent lamp to the most suitable value.

A fifth object of the invention is to readily achieve the positioning of a side terminal type heater for a fluorescent lamp.

The specific feature of the invention resides in a fluorescent lamp comprising a reflecting film formed on the inner wall of a glass tube except a part by coating, and a fluorescent film formed on the reflecting film by coating; in which a fluorescent film and/or ultraviolet rays absorbing film is formed on the part, which is not covered by the reflecting film, by coating thereby to set the ratio of bright line to fluorescence to 1.3 or less.

DESCRIPTION OF THE PREFERRED EMBODIMENTS OF THE PRESENT INVENTION

Referring to the drawings, preferred embodiments of the present invention will be described in detail.

Figure 1:
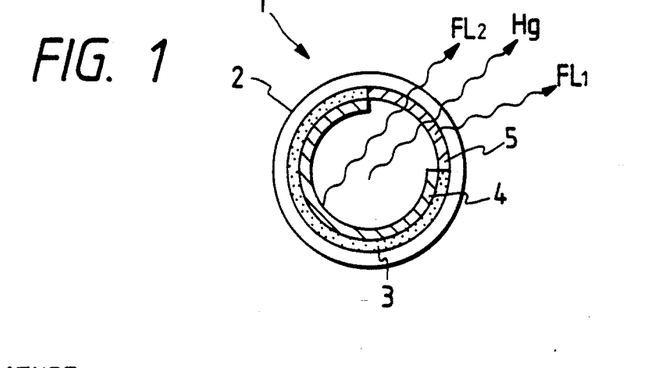
FIG. 1 is a diagram showing the structure of a fluorescent lamp according to this invention.

The specific feature of the present invention resides in a fluorescent lamp which, as shown in FIG. 1 comprises: a reflecting film 3 formed on the inner wall of a glass on tube 2 except a part by coating, and a fluorescent film 4 formed on the reflecting film 3 by coating; in which a fluorescent film and/or ultraviolet rays absorbing film is formed on the part, which is converted by the reflecting film by coating thereby to set the ratio of bright line to fluorescence to 1.3 or less.

In FIG. 1, the fluorescent film and/or the ultraviolet rays absorbing film is formed on the aperture portion which is not covered by the reflecting film. Hence, the fluorescent film or ultraviolet rays absorbing film absorbs bright lines from mercury vapor. In the case where the fluorescent film is formed on the aperture portion, the quantity of fluorescence is increased with the fluorescent film excited by the bright line, as a result of which the ratio of bright line to fluorescence is decreased. Furthermore, by setting the tube wall temperature in a range of from $35°$ C. to $70°$ C., the ratio of bright line to fluorescence can be reduced to 1.3 or less; that is, the color difference can be reduced to 3 or less. Thus, the image reproducibility is improved, and in practice, there will be no troubles nor problems with the image when viewed with the human eye.

Heretofore, even if the middle portion of the fluorescent lamp is cooled with a heat sink, the temperatures at the end portions thereof are increased by discharge heating, as a result of which the mercury vapor pressure is increased excessively, and the light emitting efficiency is decreased accordingly. In order to eliminate this difficulty, cuts are formed in the heater to improve the heat radiation characteristic thereby to improve the light distribution characteristic.

Furthermore, according to the invention, positioning protrusions are formed at the ends of a side terminal type heater for a fluorescent lamp, thus eliminating the difficulty that, in connecting the lamp to the sockets, the heater is displaced to cover the aperture portion.

Figure 2:
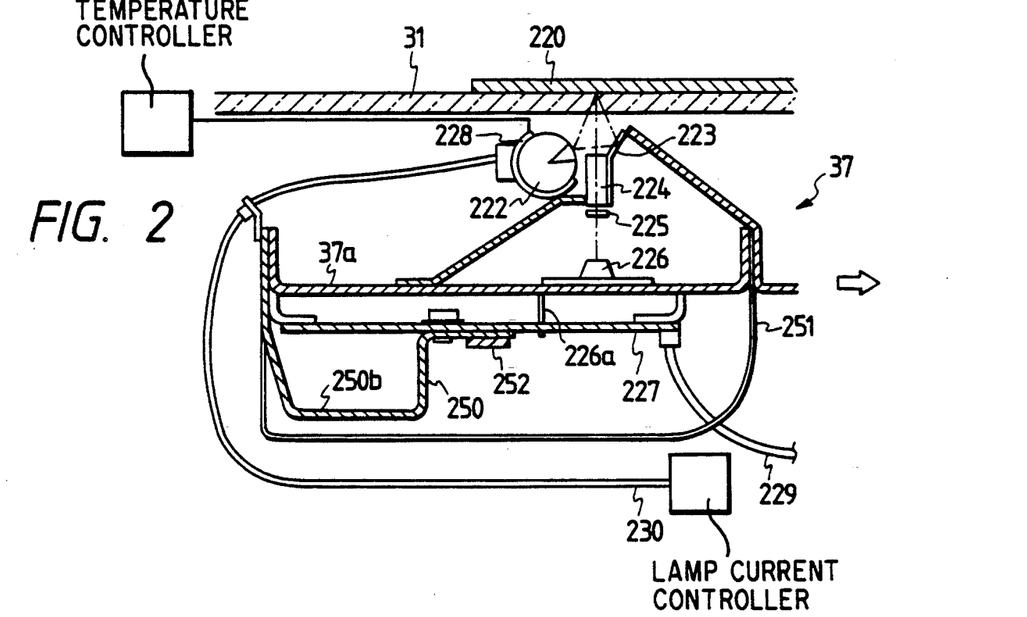
FIG. 2 is a sectional view of an imaging unit.

FIG. 2 is a sectional view of an imaging unit 37. An original 220 is placed on a platen glass plate 31 with its image surface to be read set down. The imaging unit 37 is moved below the platen glass plate in the direction of the arrow so that the original surface is exposed to light by means of a daylight fluorescent lamp 222 and a reflecting mirror 223. Light reflected from the original 220 is passed through a rod lens array 224 and a cyan filter 225, so that the erect image of the original is formed on the light receiving surface of a CCD line sensor 226 at ×1 magnification. The rod lens array 224 is a compound eye lens consisting of four lines of fiber lenses, and therefore it is light and high in resolution. Hence, the rod lens array is advantageous in that the light source may be low in electric power, and the imaging unit may be compact accordingly. In order to eliminate the difficulty that a shadow is formed in the case of a thick original, the reflecting mirror is so positioned as to irradiate the original in a direction opposite to the direction in which the fluorescent lamp emits light. It is preferable that the ratio of the quantity of light applied to the original directly by the fluorescent lamp to the quantity of light from the reflecting mirror is 1:1. The imaging unit 37 has a circuit board 227 which includes a CCD sensor drive circuit and a CCD sensor output buffer circuit. Further in FIG. 2, reference numeral 228 designates a lamp heater; 229, a flexible cable for control signals; and 230, a flexible cable for an irradiating power source. A CCD line sensor 226 is fixedly mounted on a housing 37a. The aforementioned circuit board 227 is provided below the housing 37a. A heat radiating board 250 having a protruded portion 250b is provided as the circuit board 227 and the housing 37a jointed by the protruded portion 250b. An electromagnetic shielding punching metal 251 is provided in such a manner as to cover the heat radiating board 250. A driving IC chip 252 is mounted on the circuit board 227. The CCD line sensor 226 is electrically connected to the circuit board 227 through a connecting pin 226a.

FIG. 3 shows the daylight fluorescent lamp 222 in more detail. The inner wall of a glass tube 222a except a part corresponding to an aperture angle α (about 50°) is covered by a reflecting film 222b, and the inner surface is covered by a fluorescent film 222c. That is, the fluorescent lamp is of reflection type. With the fluorescent lamp 222 thus constructed, the quantity of light is effectively applied to the surface of the original, for reduction of the power consumption. The reason why the fluorescent film 222c is formed on the entire inner surface, and the surface except for the part corresponding to the aperture angle is covered by the reflecting film 222b is as follows: The fluorescent lamp thus constructed is smaller in the quantity of light than an aperture type fluorescent lamp in which the inner surface of the glass tube except a part corresponding to an aperture angle is covered by a fluorescent film; however, as the bright line produced by mercury vapor is absorbed by the fluorescent film, the ratio of the intensity of a bright line in the spectrum of irradiating light to that of fluorescence produced is reduced. A lamp heater 228 and a heat sink (or heat radiating member) are provided around the fluorescent lamp 222. The lamp heater 228 and a cooling fan are controlled in response to temperatures detected by a thermistor 222e.

Figure 4:
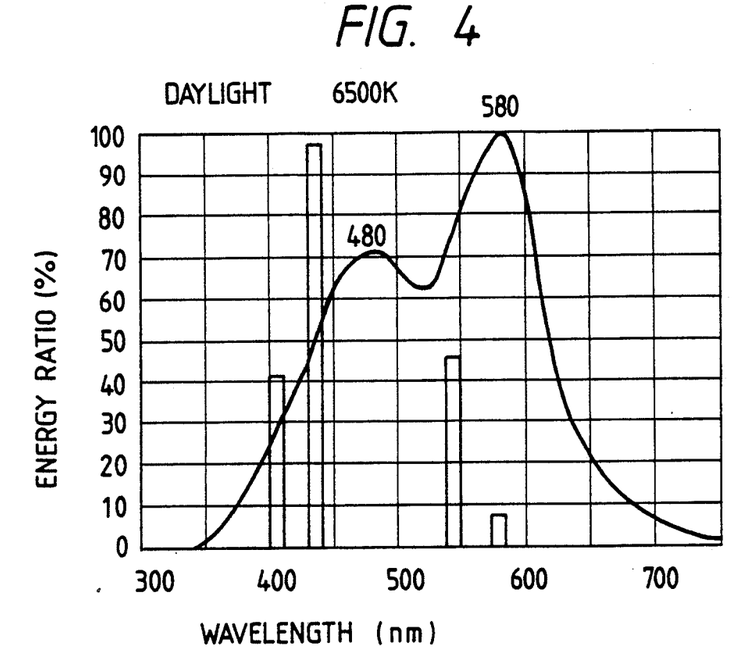
FIG. 4 is a graphical representation showing an energy spectral characteristic of a daylight fluorescent lamp employed in the invention.

FIG. 4 shows an energy spectral characteristic of the daylight fluorescent lamp employed in the invention. The specific feature of the daylight fluorescent lamp resides in that it is larger in B component than other fluorescent lamps, and is improved in R, G and B ratio.

The reason why the daylight fluorescent lamp improved in B component is employed in the invention will be described.

Figure 5:
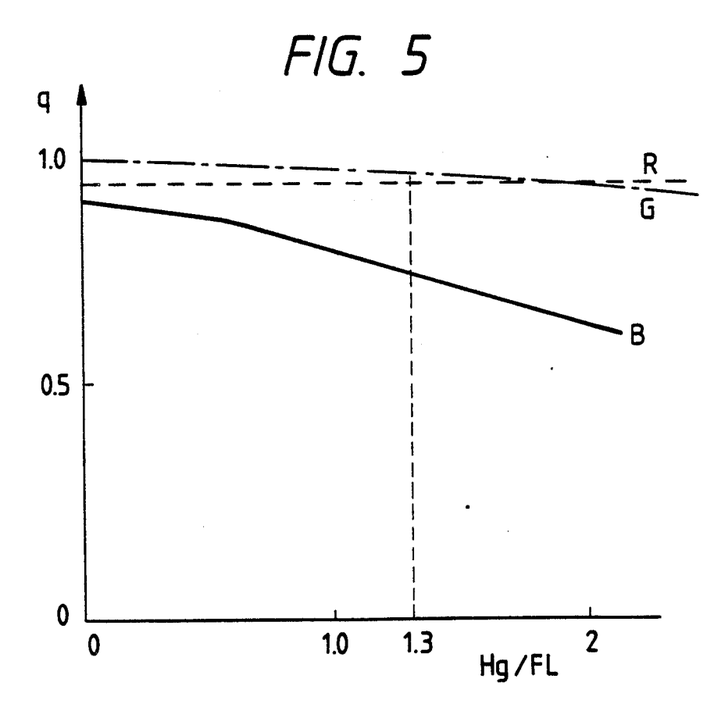
FIG. 5 is a graphical representation indicating value q with bright line to fluorescence ratio.

In FIG. 5, the horizontal axis represents bright line to fluorescence ratios, and the vertical axis represents values q which are deviations from the three stimulus values to the human eye whose ideal values are set to one (1). The value q is defined as follows:

$$q = \{\text{daylight fluorescent substance} + k \cdot (\text{bright line})\} \times \text{filter characteristic} \times \sqrt{\text{standard light source}} \times CCD \text{ sensitivity.}$$

In the equation, the term "{daylight fluorescent substance+k·(bright line)}×filter characteristic" is a value determined from the mechanical arrangement of the light source. The product of this value, the CCD sensitivity and the square of the standard light source represents the deviation from the stimulus value provided when viewed with the human eye.

In FIG. 5, in the cases of R and G components, the value q remains substantially unchanged with the bright line to fluorescence ratio; whereas in the case of B component, the value q decreases gradually. And it has been found that, in the case where the value q decreases deviating from the ideal three stimulus values in this manner, color difference 3, which is the threshold value to determine whether or not the human eye can perceive color difference, is reached when the bright line to fluorescence ratio is 1.3. Thus, to improve the color rendering characteristic of B is to improve the bright light to fluorescence ratio. That is, the daylight fluorescent lamp having the characteristic shown in FIG. 4 is excellent in image reproducibility.

Furthermore, in the invention, as shown in FIG. 1, a fluorescent film and/or mercury bright line absorbing film are formed on the aperture portion of the glass tube, to absorb bright lines. The fluorescent film on the aperture portion produces fluorescence. In addition, the bright line to fluorescence ratio can be decreased by setting a tube wall temperature and a tube current to values in predetermined ranges, which prevents the occurrence of the metamerism phenomenon.

Figure 6:
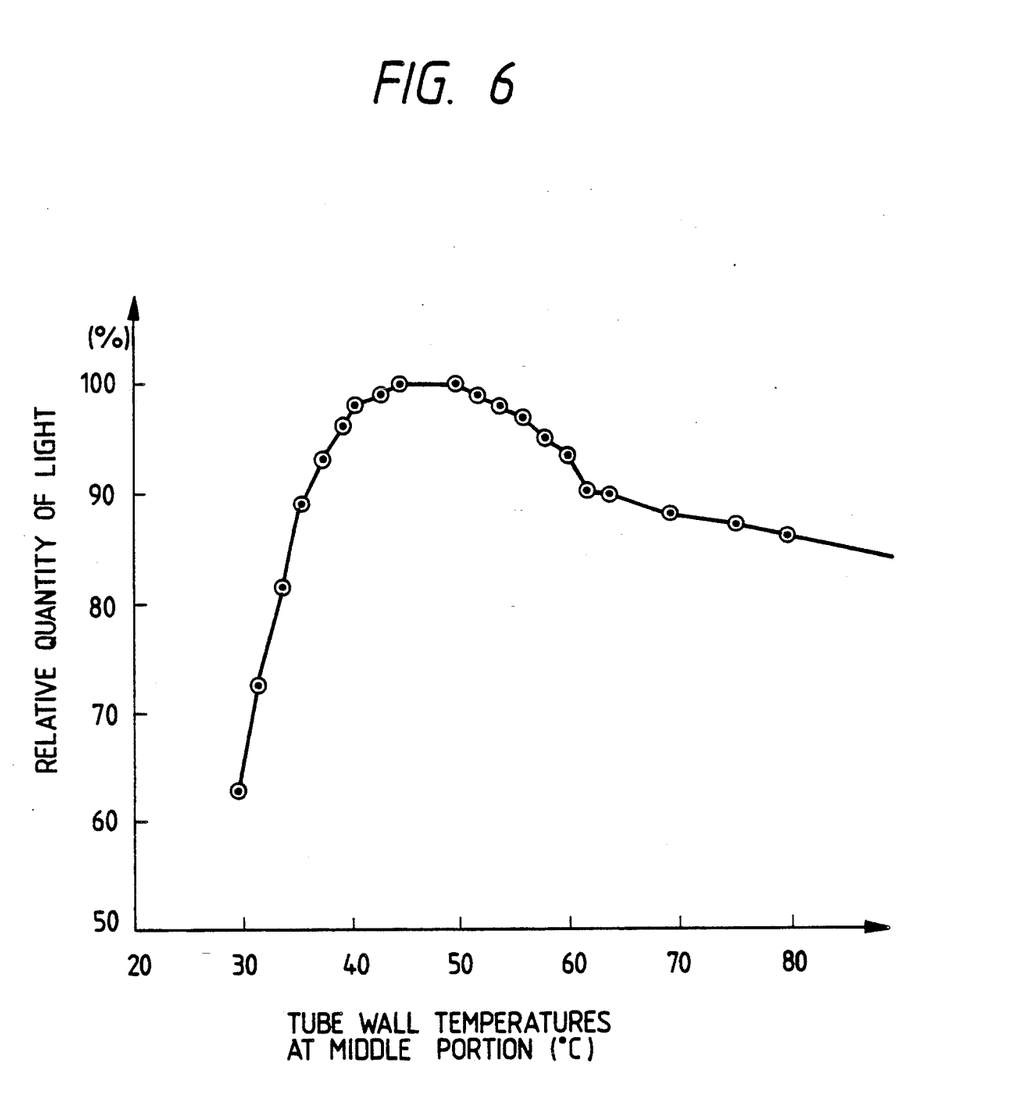
FIG. 6 is a graphical representation indicating the relation between the tube wall temperature of the middle portion of the lamp and the quantity of light.

FIG. 6 is a graphical representation indicating tube wall temperatures at the middle portion of the tube with quantities of light.

Figure 7:
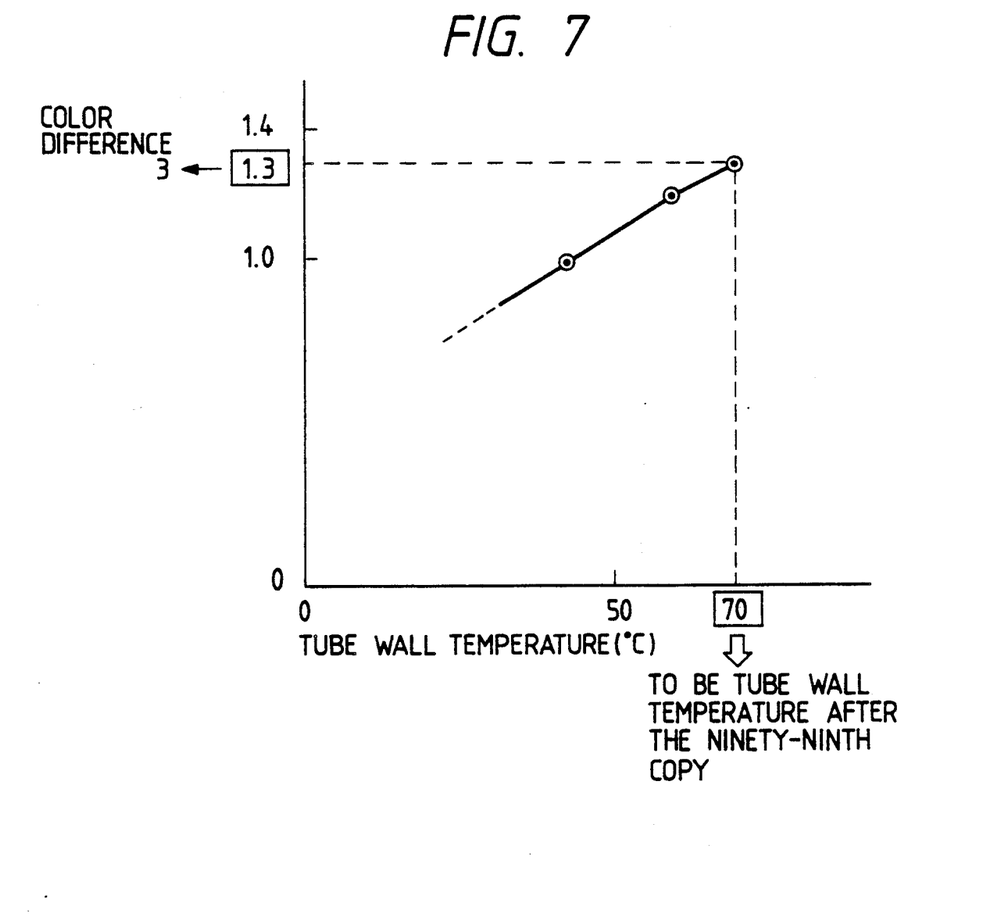
FIG. 7 is a graphical representation indicating tube wall temperature with bright line to fluorescence ratio.

Upon investigation on the relationships between the tube wall temperatures and the bright line to fluorescence ratios, it has been found that when, in the case where a copying operation is carried out continuously, as shown in FIG. 7 the ninety-ninth copy is printed out, the tube wall temperature is raised to 70° C., and a bright line to fluorescence ratio of 1.3, i.e., color difference 3 is reached; and when the tube wall temperature is higher, then the color difference is also higher, so that the image reproducibility is lowered. Thus, it is preferable that the tube wall temperature is 70° C. or lower. As is apparent from FIG. 6, what correspond in the quantity of light to 70° C. on the low temperature side is 35°

C., and therefore the tube wall temperatures should be ranged from 35° C. to 70° C.

Figure 8:
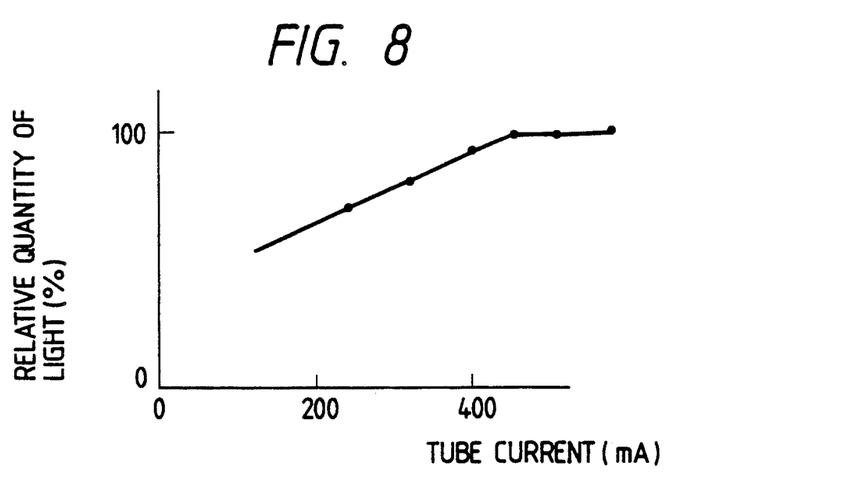
FIG. 8 is a graphical representation indicating tube current with light quantity.

Furthermore, it is apparent from FIG. 8 that, in a daylight fluorescent lamp (15.5 mm in diameter), as the tube current increases, the relative quantity of light is increased, and the latter is saturated when the current exceeds 400 mA. Hence, in order to increase the quantity of light effectively and to reduce the bright line to fluorescence ratio to 1.3 or less, it is preferable that the tube wall temperature is in a range of from 35° C. to 70° C. The tube current with which the relative quantity of light is saturated is 800 mA in the case of a tube diameter of 25 mm, and 2 A in the case of a tube diameter of 38 mm, and accordingly the fluorescent lamps are used with tube currents lower than those values.

If an ultraviolet rays preventing film is formed on the fluorescent film, then a bright light of 435 nm can be cut off. However, the thickness of the ultraviolet rays preventing film should be limited to a certain value, because if it is excessively large, then the quantity of light is decreased. In this case, the ultraviolet rays preventing film may be formed solely on the aperture portion of the glass tube, or it may be formed together with the fluorescent film as a dual layer there.

Figure 9:
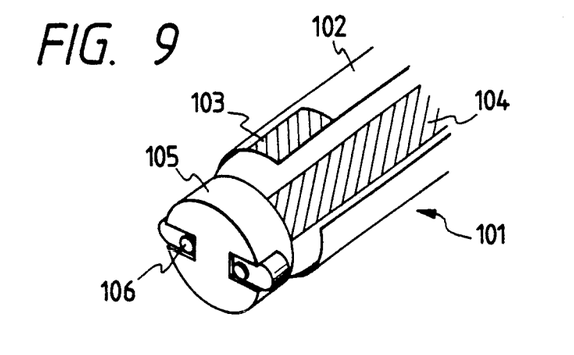
FIG. 9 is a diagram showing a fluorescent lamp, one embodiment of the invention to improve a light distribution characteristic.
Figure 10:
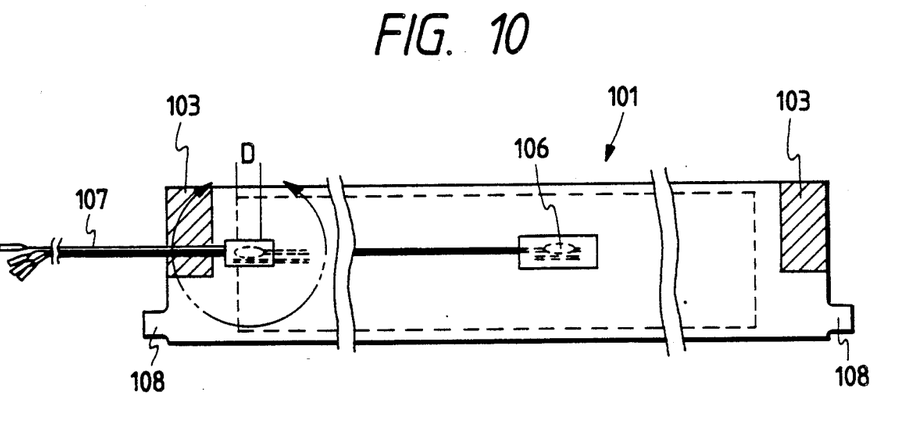
FIG. 10 is a side view of the fluorescent lamp shown in FIG. 9.

FIGS. 9 and 10 are diagrams showing one embodiment of this invention in which the light distribution characteristic is improved.

As was described before, with the heat sink provided for the middle portion of the glass tube, the temperatures at the two end portions of the glass tube are increased by discharge heating, so that the light emitting efficiency is decreased. In order to eliminate this difficulty, as shown in FIG. 9 at each of the end portions of the glass tube the heater 102 has a cut 103 so as to radiate heat through it to prevent the rise of temperature, thereby to improve the light emitting efficiency.

In the fluorescent lamp, the quantity of light depends on the tube wall temperature. In order to eliminate this difficulty, the lamp heater 102 is coupled to the lamp. Furthermore, as shown in FIG. 10, a temperature detecting sensor 106 comprising a thermistor and a thermal reed switch is provided at the middle of the lamp, and the heater or cooling fan (not shown) are turned on and off according to temperatures detected by the sensor 106 so that the lamp is held at the most suitable temperature. Furthermore, even during the standby period in which the image recording device is not operated, the temperature of the lamp is controlled to a suitable value so that the lamp can be turned on at any time and the tube wall temperature and the light quantity stability are maintained unchanged. In addition, in order to improve the lighting start characteristic of the lamp and to increase the service life of the latter, the filaments are preheated during the standby period. Thus, during the standby period and while the lamp is kept turned on, the heat generated by the filaments make the temperature of the tube wall higher than that of the middle portion of the lamp. However, the provision of the cuts 103 improves the heat radiation characteristic of the lamp, and the light distribution characteristic in the direction of the axis of the lamp during continuous operation. Furthermore, the provision of the cuts allows the operator to observe the lamp filaments from above with the heater coupled to the lamp. Therefore, the operator can readily confirm to what degree the filaments have been preheated, and can find the failure of the lamp due to the burn out of the filaments quickly.

In the above-described embodiment, the fluorescent lamp is provided with the heat sink. However, the technical concept of the invention is applicable to a fluorescent lamp having no heat sink.

Figure 11A:
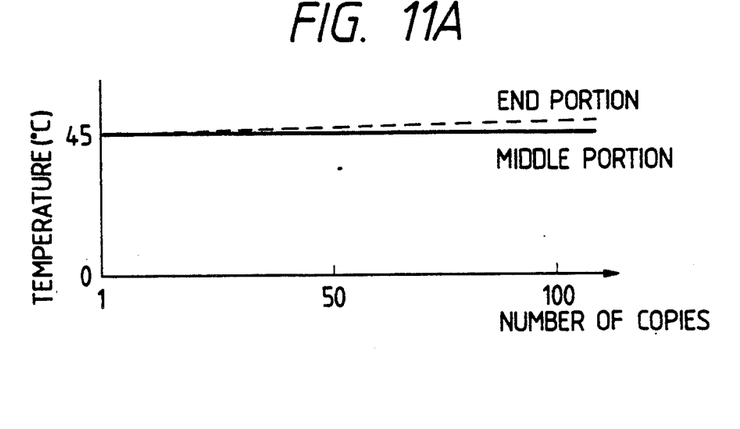
FIG. 11A is a graphical representation indicating the relation between temperatures and numbers of copies.
Figure 11B:
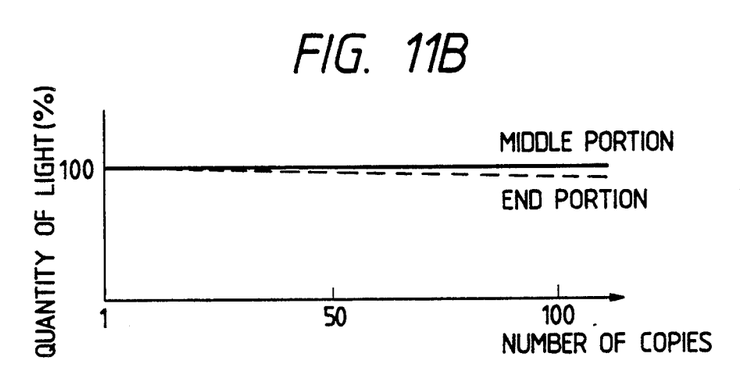
FIG. 11B is also a graphical representation indicating the relation between light quantities and numbers of copies.
Figure 12:
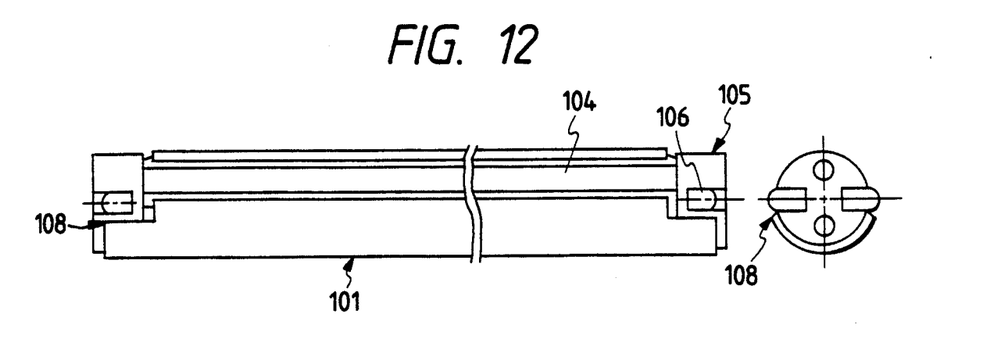
FIG. 12 is a diagram for a description of the connection of the fluorescent lamp according to the invention to the sockets.

As shown in FIG. 11A, when the temperature of the middle portion of the fluorescent lamp is controlled to 45° C. for instance, the temperature of the end portions of the fluorescent lamp is made substantially equal to the temperature of the middle portion as indicated by the broken line. As a result, even in the case where a number of copies are printed, as shown in FIG. 11B the middle portion and the end portions of the lamp are stable in the quantity of light; that is, the fluorescent lamp is improved in light distribution characteristic.

In the fluorescent lamp according to the invention, as shown in FIG. 10 positioning protrusions 108 are provided at the ends of the heater. In combining the heater with the lamp, the positioning protrusions 108 are abutted against the bases 105 of the lamp. The lamp with the heater is connected to the sockets according to the method described with reference to FIGS. 22 and 23. In this case, since the positioning protrusions 108 are abutted against the conductors 106 at the bases of the lamp, the heater itself is not turned, which prevents the difficulty that the heater is displaced in connecting the lamp to the sockets.

As was described above, according to the invention, with the fluorescent film and/or the ultraviolet rays absorbing film formed on the aperture portion of the tube, the tube wall temperature and the lamp tube current are controlled to predetermined values, whereby the bright line to fluorescence ratio is set to 1.3 or lower, and the image reproducibility is improved. Furthermore, the provisions of the cuts at the ends of the heater improves the heat radiation characteristic at the end portions of the lamp and the light distribution characteristic of the same. In addition, the positioning protrusions provided at the ends of the heat prevents the displacement of the heater in connection of the lamp to the sockets, and accordingly the erroneous operation of the image recording device.

What is claimed is:

1. An illuminating light source for a color image recording device comprising:

a glass tube for mounting in the device, said glass tube having a predetermined diameter and an inner wall, said inner wall having a first portion and a second portion;

a reflecting film coated on said first portion of said inner wall of said glass tube;

a fluorescent film formed on said reflecting film coated on said glass tube; wherein at least one of an ultraviolet ray absorbing film and said fluorescent film is formed on said second portion of said inner wall of said glass tube to maintain a ratio of a bright line to a fluorescence being not more than 1.3 when a fluorescent lamp current is applied;

a heater provided on an outer wall of said glass tube for preheating said glass tube and maintaining the temperature of the glass tube in a predetermined temperature range;

sensor means for detecting the temperature of said glass tube wall and outputting an output value corresponding to said detected temperature; and a temperature controller for controlling the temperature of said heater in response to said output value of said sensor means to maintain said one of said predetermined temperature of said glass tube to thereby maintain the bright line to fluorescence ratio at 1.3 or less when said one of said ultraviolet absorbing film and said fluorescent film formed on said second portion of said inner wall of said glass tube is incapable of maintaining the bright line to fluorescence ratio at 1.3 or less due to an excessive amount of operation.

2. An illuminating light source as claimed in claim 1, wherein said temperature range of said glass tube wall is from 35° C. to 70° C.

3. An illuminating light source as claimed in claim 1, wherein said second portion of said inner wall comprises an aperture portion having an aperture angle of substantially 90°.

4. An illuminating light source for a color image recording device comprising:

a glass tube for mounting in the device, said glass tube having a predetermined diameter and an inner wall, said inner wall having a first portion and a second portion;

a reflecting film coated on said first portion of said inner wall of said glass tube;

a fluorescent film formed on said reflecting film coated on said glass tube; wherein at least one of an ultraviolet ray absorbing film and said fluorescent film is formed on said second portion of said inner wall of said glass tube to maintain a ratio of a bright line to a fluorescence being not more than 1.3 when a fluorescent lamp current is applied; and a current controller for effectively increasing the quantity of light without saturating said quantity of light by controlling said fluorescent lamp current to not exceed a predetermined value according to said diameter of said glass tube to maintain the bright line to fluorescence ratio at 1.3 or less when said one of said ultraviolet absorbing film and said fluorescent film formed on said second portion of said inner wall of said glass tube is incapable of maintaining the ratio at 1.3 or less due to an excessive amount of operation.

5. An illuminating light source as claimed in claim 4, wherein said diameter of said glass tube is substantially 15.5 mm and said predetermined value of said fluorescent lamp current is not more than 400 mA.

6. An illuminating light source as claimed in claim 4, wherein said diameter of said glass tube is substantially 25 mm and said predetermined value of said fluorescent lamp current is not more than 800 mA.

7. An illuminating light source as claimed in claim 4, wherein said diameter of said glass tube is substantially 38 mm and said predetermined value of said fluorescent lamp current is not more than 2 A.

8. An illuminating light source for a color image recording device comprising:

a glass tube for mounting in the device, said glass tube having a predetermined diameter and an inner wall, said inner wall having a first portion and a second portion;

a reflecting film coated on said first portion of said inner wall of said glass tube;

a fluorescent film formed on said reflecting film coated on said glass tube; wherein at least one of an ultraviolet ray absorbing film and said fluorescent film is formed on said second portion of said inner wall of said glass tube to maintain a ratio of a bright line to a fluorescence being not more than 1.3 when a fluorescent lamp current is applied;

a heater, provided on an outer wall of said glass tube, for preheating said glass tube and maintaining the temperature of the glass tube in a predetermined temperature range, said heater having a positioning part provided at an end portion of said heater in order to prevent the displacement of the heater when said glass tube is mounted in the device;

sensor means for detecting the temperature of said glass tube wall and outputting an output value corresponding to said detected temperature; and a temperature controller for controlling the temperature of said heater in response to said output value of said sensor means to maintain said predetermined temperature of said glass tube to maintain the bright line to fluorescence ratio at 1.3 or less when said one of said ultraviolet absorbing film and said fluorescent film formed on said second portion of said inner wall of said glass tube is incapable of maintaining the ratio at 1.3 or less due to an excessive amount of operation.

9. An illuminating light source for a color image recording device comprising:

a glass tube having a predetermined diameter and an inner wall, said inner wall having a first portion and a second portion;

a reflecting film coated on said first portion of said inner wall of said glass tube;

a fluorescent film formed on said reflecting film coated on said glass tube; wherein at least one of an ultraviolet ray absorbing film and said fluorescent film is formed on said second portion of said inner wall of said glass tube to maintain a ratio of a bright line to a fluorescence being not more than 1.3 when a fluorescent lamp current is applied;

a heater, provided on an outer wall of said glass tube, for preheating said glass tube and maintaining the temperature of the glass tube in a predetermined temperature range;

sensor means for detecting the temperature of said glass tube wall and outputting an output value corresponding to said detected temperature;

a controller for controlling the operation of said heater in response to said output value of said sensor means to maintain said predetermined temperature of said glass tube to maintain the bright line to fluorescence ratio at 1.3 or less when said one of said ultraviolet absorbing film and said fluorescent film formed on said second portion of said inner wall of said glass tube is incapable of maintaining the ratio at 1.3 or less due to an excessive amount of operation; and dissipating means for dissipating heat from predetermined location of the glass tube.

10. An illuminating light source as claimed in claim 9, wherein said dissipating means comprises a cut out portion at each of the end portions of said heater.

* * * * *

UNITED STATES PATENT AND TRADEMARK OFFICE
CERTIFICATE OF CORRECTION

PATENT NO. : 5,059,860
DATED : October 22, 1991
INVENTOR(S) : Masaaki Sato et al.

It is certified that error appears in the above-identified patent and that said Letters Patent is hereby corrected as shown below:

On the Title page:

Abstract, line 6, before "ultraviolet" change "a" to --an--.

Claim 3, column 9, line 14, change "90°" to --50°--.

Signed and Sealed this

Eighteenth Day of May, 1993

Attest:

MICHAEL K. KIRK

*Attesting Officer*   Acting Commissioner of Patents and Trademarks